(12) United States Patent
Derbeko et al.

(10) Patent No.: US 9,170,942 B1
(45) Date of Patent: Oct. 27, 2015

(54) SYSTEM, APPARATUS, AND METHOD OF AUTOMATIC DATA PADDING

(71) Applicant: EMC Corporation, Hopkinton, MA (US)

(72) Inventors: Philip Derbeko, Modiin (IL); Zvi Gabriel Benhanokh, Tel Aviv (IL); Arieh Don, Newton, MA (US); Yaron Dar, Sudbury, MA (US); Anat Eyal, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 117 days.

(21) Appl. No.: 14/145,313

(22) Filed: Dec. 31, 2013

(51) Int. Cl.
*G06F 12/02* (2006.01)
*G06F 12/08* (2006.01)

(52) U.S. Cl.
CPC ........ *G06F 12/0802* (2013.01); *G06F 12/0246* (2013.01)

(58) Field of Classification Search
CPC .................. G06F 12/0802; G06F 12/0246
USPC .............. 711/103, 112, 114, 118, 154, 156; 365/185.33
See application file for complete search history.

(56) References Cited

U.S. PATENT DOCUMENTS

| 5,526,507 A * | 6/1996 | Hill ............................... 711/114 |
| 5,544,346 A * | 8/1996 | Amini et al. ................... 711/154 |
| 5,644,729 A * | 7/1997 | Amini et al. ................... 710/310 |
| 5,809,514 A * | 9/1998 | Nasserbakht et al. ............ 711/3 |
| 5,850,632 A * | 12/1998 | Robertson ...................... 711/170 |
| 5,860,091 A * | 1/1999 | DeKoning et al. ............ 711/114 |
| 6,138,207 A * | 10/2000 | Rossum ........................ 711/118 |
| 6,484,235 B1 * | 11/2002 | Horst et al. .................... 711/114 |
| 6,487,633 B1 * | 11/2002 | Horst et al. .................... 711/112 |
| 6,591,338 B1 * | 7/2003 | Horst et al. .................... 711/114 |
| 6,591,339 B1 * | 7/2003 | Horst et al. .................... 711/114 |
| 6,877,045 B2 * | 4/2005 | Goode et al. ....................... 710/6 |
| 8,078,799 B2 * | 12/2011 | Balsubramanian ........... 711/114 |
| 8,122,157 B2 * | 2/2012 | Beaman ............................ 710/6 |
| 8,296,530 B1 * | 10/2012 | Prasad et al. ................... 711/154 |
| 8,321,650 B2 * | 11/2012 | Steinmetz et al. ............ 711/171 |
| 8,380,926 B1 * | 2/2013 | Foley et al. ................... 711/114 |
| 8,464,021 B2 * | 6/2013 | Allen et al. ................... 711/202 |
| 8,499,102 B2 * | 7/2013 | Beaman ............................ 710/6 |
| 8,874,524 B1 * | 10/2014 | Zhao et al. .................... 707/657 |
| 8,880,784 B2 * | 11/2014 | Chiueh et al. ................ 711/103 |
| 8,892,811 B2 * | 11/2014 | Ish et al. ....................... 711/103 |
| 2010/0199036 A1 * | 8/2010 | Siewert et al. ................ 711/112 |
| 2011/0153911 A1 * | 6/2011 | Sprouse et al. ............... 711/103 |
| 2012/0254549 A1 * | 10/2012 | Hutchison et al. ............ 711/136 |

* cited by examiner

*Primary Examiner* — Stephen Elmore
(74) *Attorney, Agent, or Firm* — Krishnendu Gupta; Konrad R. Lee

(57) ABSTRACT

A computer-executable method, system, and computer program product for managing a data storage system, wherein the data storage system includes a host-cache and a data storage array, the computer-executable method, system, and computer program product comprising receiving an I/O request, processing the I/O request by locating data related to the I/O request and aligning the I/O request with the data to create an aligned portion of data, and updating the data storage array with the aligned portion of data.

18 Claims, 15 Drawing Sheets

SYSTEM, APPARATUS, AND METHOD OF AUTOMATIC DATA PADDING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product for managing a data storage system, wherein the data storage system includes a host-cache and a data storage array, the computer-executable method, system, and computer program product comprising receiving an I/O request, processing the I/O request by locating data related to the I/O request and aligning the I/O request with the data to create an aligned portion of data, and updating the data storage array with the aligned portion of data.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Traditionally, data storage system store data in aligned pre-set data chunks. Generally, data storage systems use a uniform pre-set chunk within each underlying data storage array. Conventionally, many data storage arrays use 8 KB pre-set data chunks, however, pre-set data chunks may be of any size. Typically, I/Os received by data storage systems are not received in an aligned format and need to be processed before being written to any underlying data storage array. Traditionally, data storage systems process unaligned I/Os by executing read-modify-writes on the unaligned I/O. Conventionally, a read-modify-write can be an expensive operation to execute and alternatives to the read-modify write would be beneficial to data storage technologies.

In many embodiments, the current disclosure enables optimization for hosts that save data on data storage arrays for protection and that may use host-based fast non-volatile memory (i.e. flash memory) to accelerate access to the data. In various embodiments, accelerated access may be enabled by saving the data on the flash card entirely with periodic backup to the array (protected Direct Attached Storage (DAS)) or may be enabled by caching the data on flash for fast access while keeping the data on the array for protection. In certain embodiments, the current disclosure may enable utilizing host-cache to perform data padding to optimize I/O with underlying data storage arrays.

In many embodiments, the current disclosure may enable creation of a data management module to manage aligning and/or reading and writing data from an underlying data storage array. In various embodiments, a data management module may be enabled to determine the alignment of an underlying data storage array. In certain embodiments, a data management module may be enabled to process incoming I/Os to align each I/O according to the underlying data storage arrays. In some embodiments, when an I/O is unaligned, the data management module may be enabled to determine whether chunks of data related to a received unaligned I/O may be in cache. In many embodiments, if related chunks of data are in cache, a data management module may be enabled to modify the cached data with the unaligned I/O and perform an aligned write to the underlying data storage array using cached data. In various embodiments, if chunks of data related to a received unaligned I/O are not in cache, a data management module may be enabled to retrieve the data related to the received unaligned I/O and modify the data within host-cache and write an aligned chunk of data to a data storage array.

Figure 1:
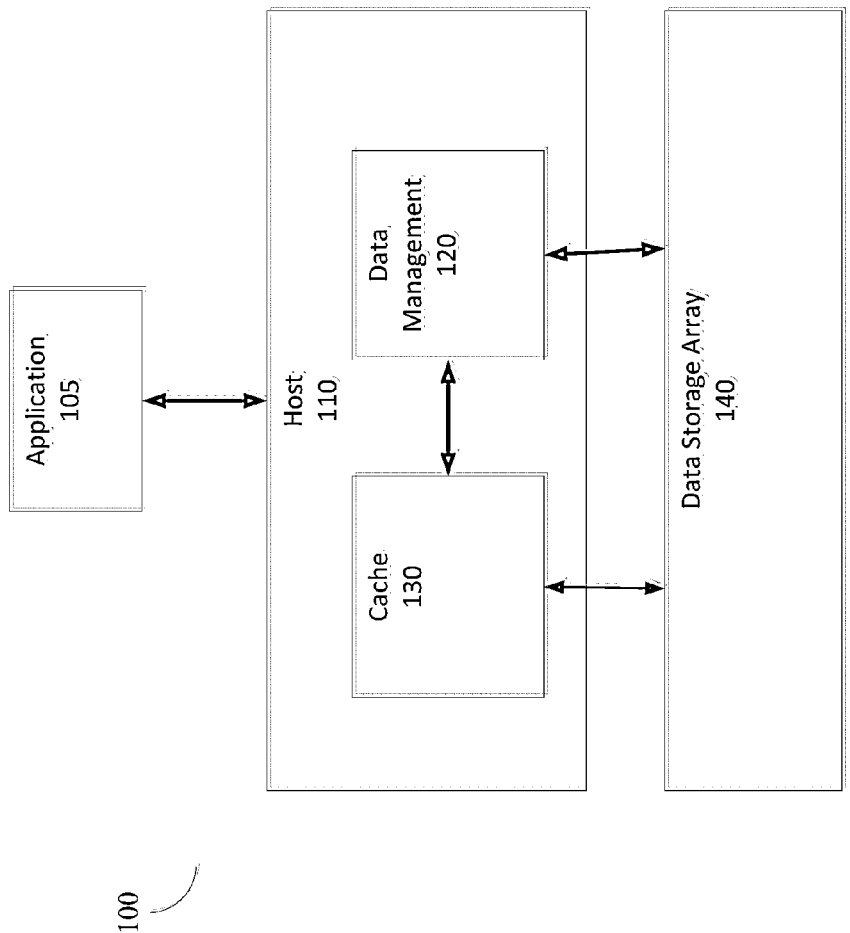
FIG. 1 is a simplified illustration of a data storage system, in accordance with an embodiment of the present disclosure.

Refer to the example embodiment of FIG. 1. FIG. 1 is a simplified illustration of a data storage system, in accordance with the present disclosure. Data storage system 100 includes host 110 and data storage array 140. As shown, host 110 includes data management module 120 and host-cache 130. In this embodiment, data management module 120 is enabled to manage data stored on data storage system 100. Application 105 runs on host 110 and is enabled to store data on data storage system 100 in data storage array 140. As shown, data management module 120 is enabled to cache data on host cache 130 to enable faster access of data by application 105. In many embodiments, cache may be flash cache.

Figure 2:
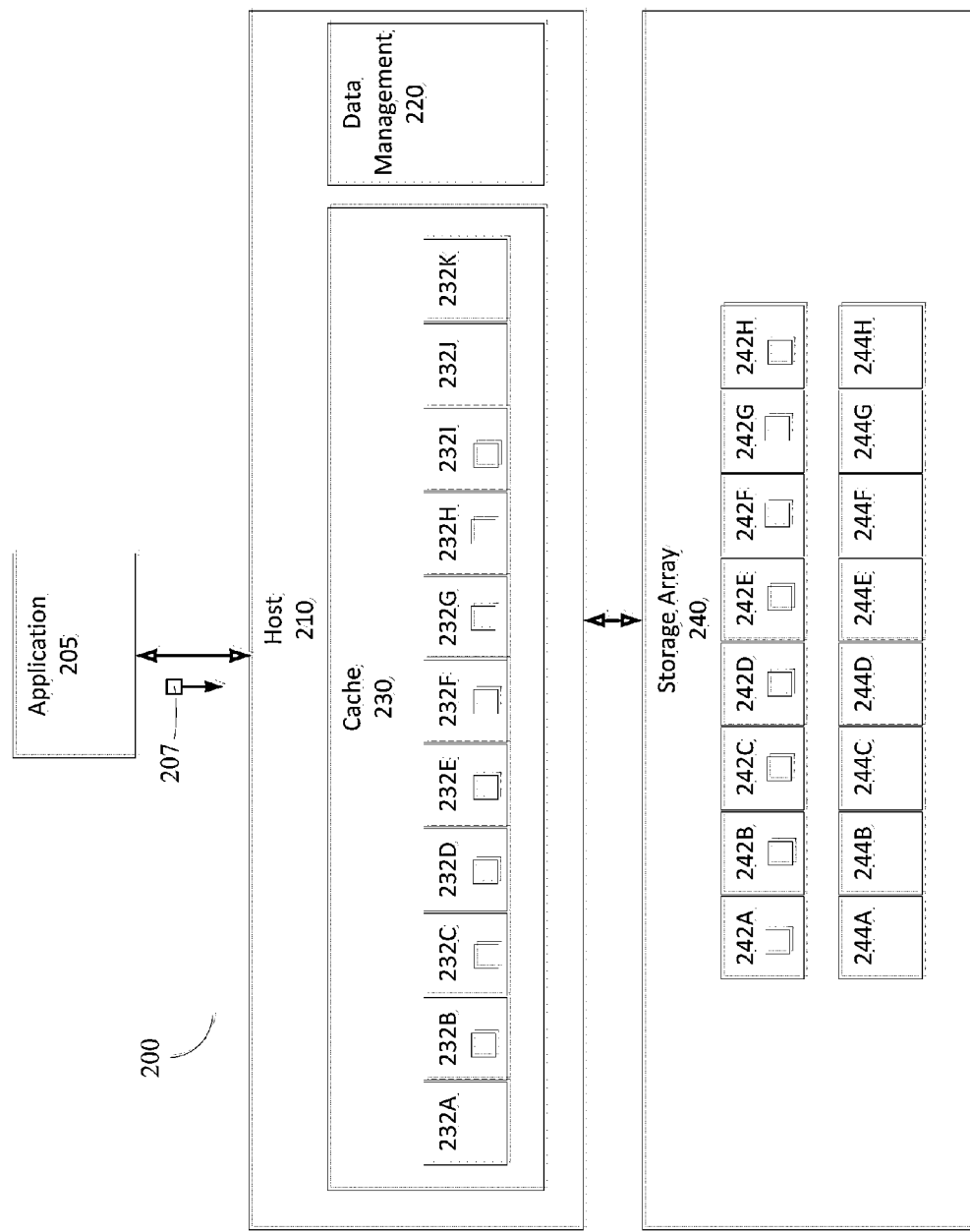
FIG. 2 is a simplified state diagram of a data storage system, in accordance with the present disclosure.

Refer to the example embodiment of FIG. 2. FIG. 2 is a simplified state diagram of a data storage system, in accordance with the present disclosure. Data storage system 200 includes host 210 and data storage array 240. Host 210 includes data management module 220 and host-cache 230. Host-cache 230 includes memory portions (232A-K, 232 generally) which are enabled to store data blocks. Data storage array 240 includes storage portions (242A-H, 242 generally), (244A-H, 244 generally). In many embodiments, memory portions within host-cache and storage portions in a data storage array may not be equal in size. In various embodiments, memory portions in cache may be smaller than memory portions in a data storage array. As shown, storage portions (242A-H) are cached in host-cache 230 in memory portions 232B-I. In this embodiment, Application 205 sends an I/O request in message 207 to data storage array 200. As shown, the I/O request in message 207 is enabled to be a read request, write request, and/or a modification request directed towards data in the data storage array.

Figure 3:
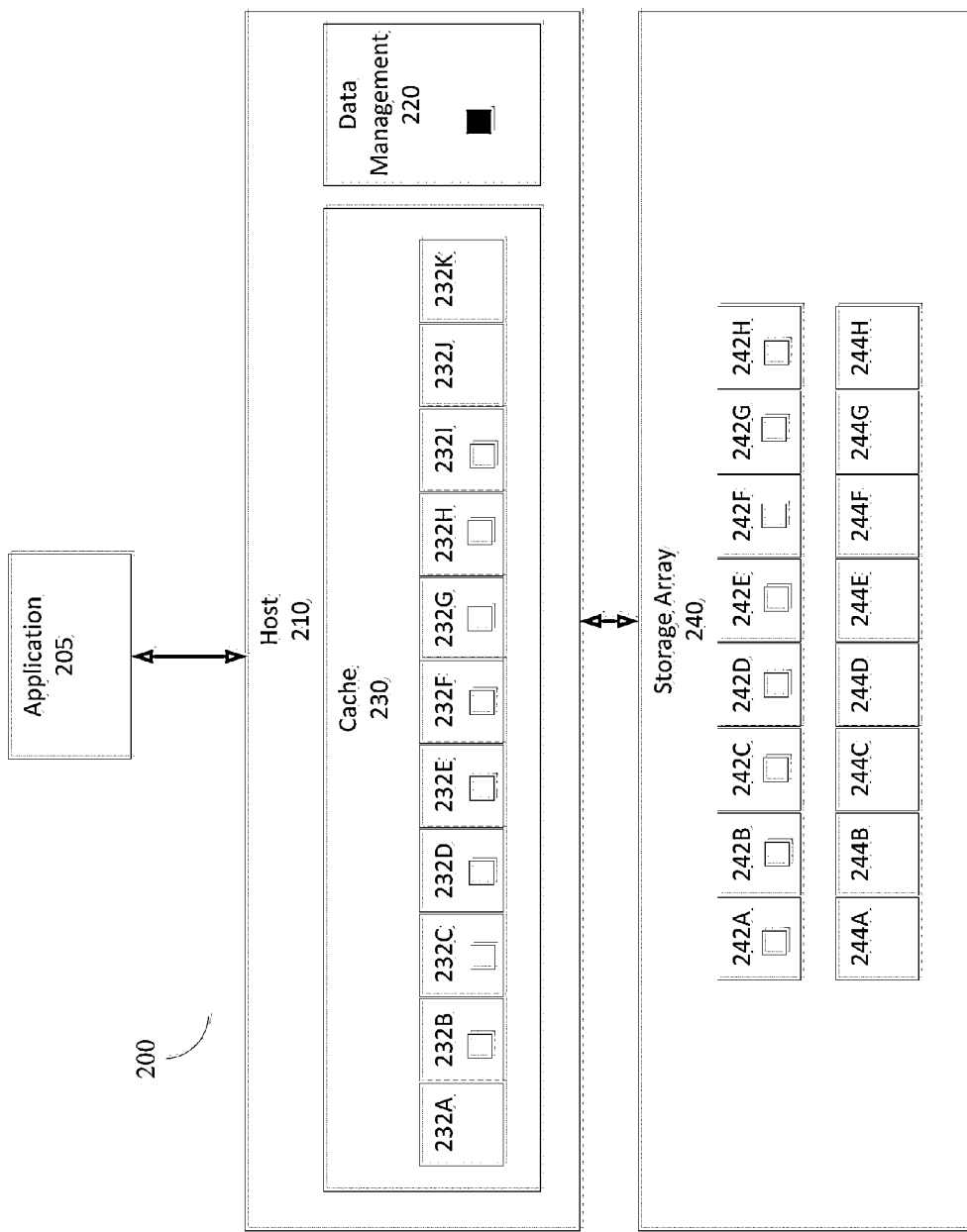
FIG. 3 is a simplified state diagram of a data storage system, in accordance with the present disclosure.

Refer to the example embodiment of FIG. 3. FIG. 3 is a simplified state diagram of a data storage system, in accordance with the present disclosure. As shown, data management module 220 contains a data block that application 205 sent to data storage system in the I/O request sent in message 207 (FIG. 2).

Figure 4:
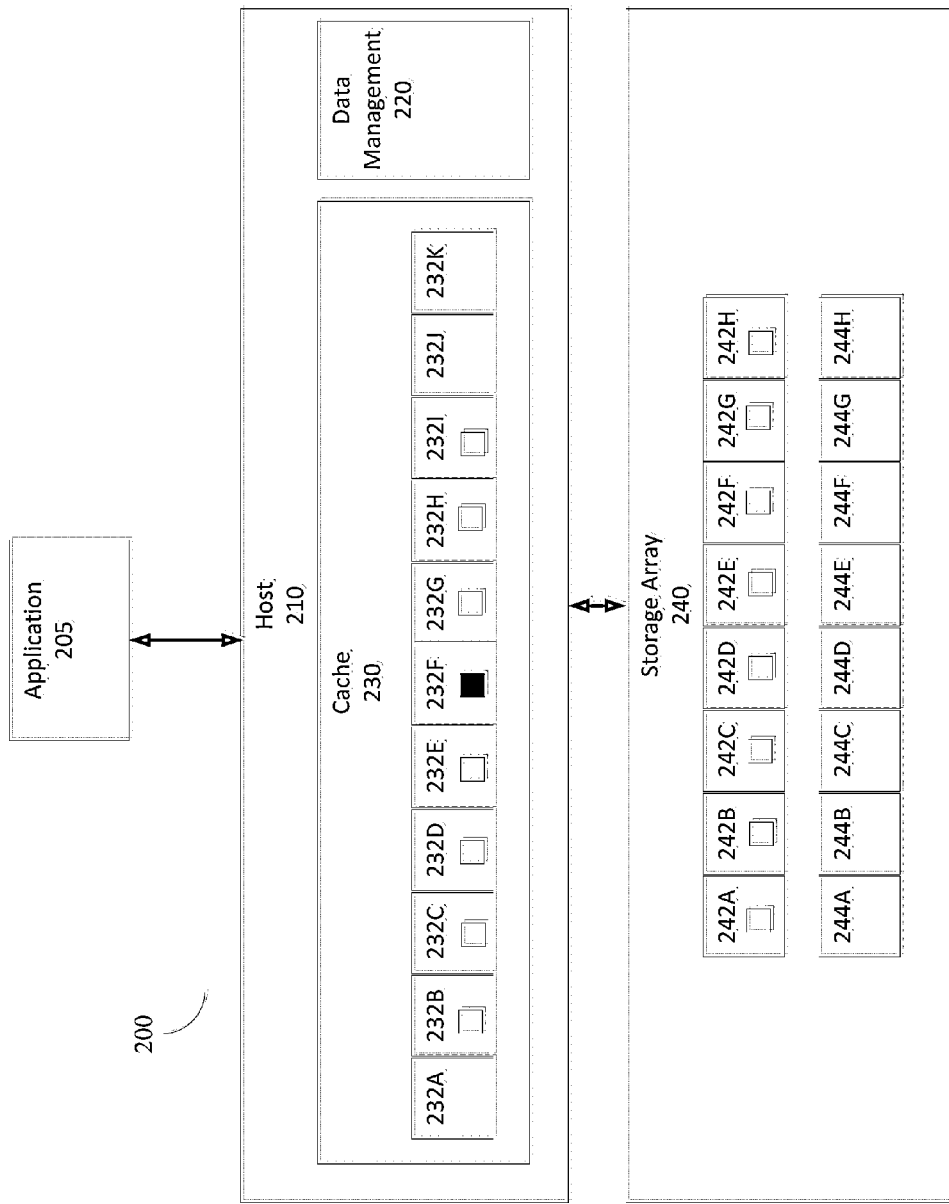
FIG. 4 is a simplified state diagram of a data storage system, in accordance with the present disclosure.

Refer to the example embodiment of FIG. 4. FIG. 4 is a simplified state diagram of a data storage system, in accordance with the present disclosure. As shown, data management module 220 has determined that data blocks related to the received I/O request are currently located in host-cache 230. Data management module 220 modifies memory portion 232F within host-cache 230.

Figure 5:
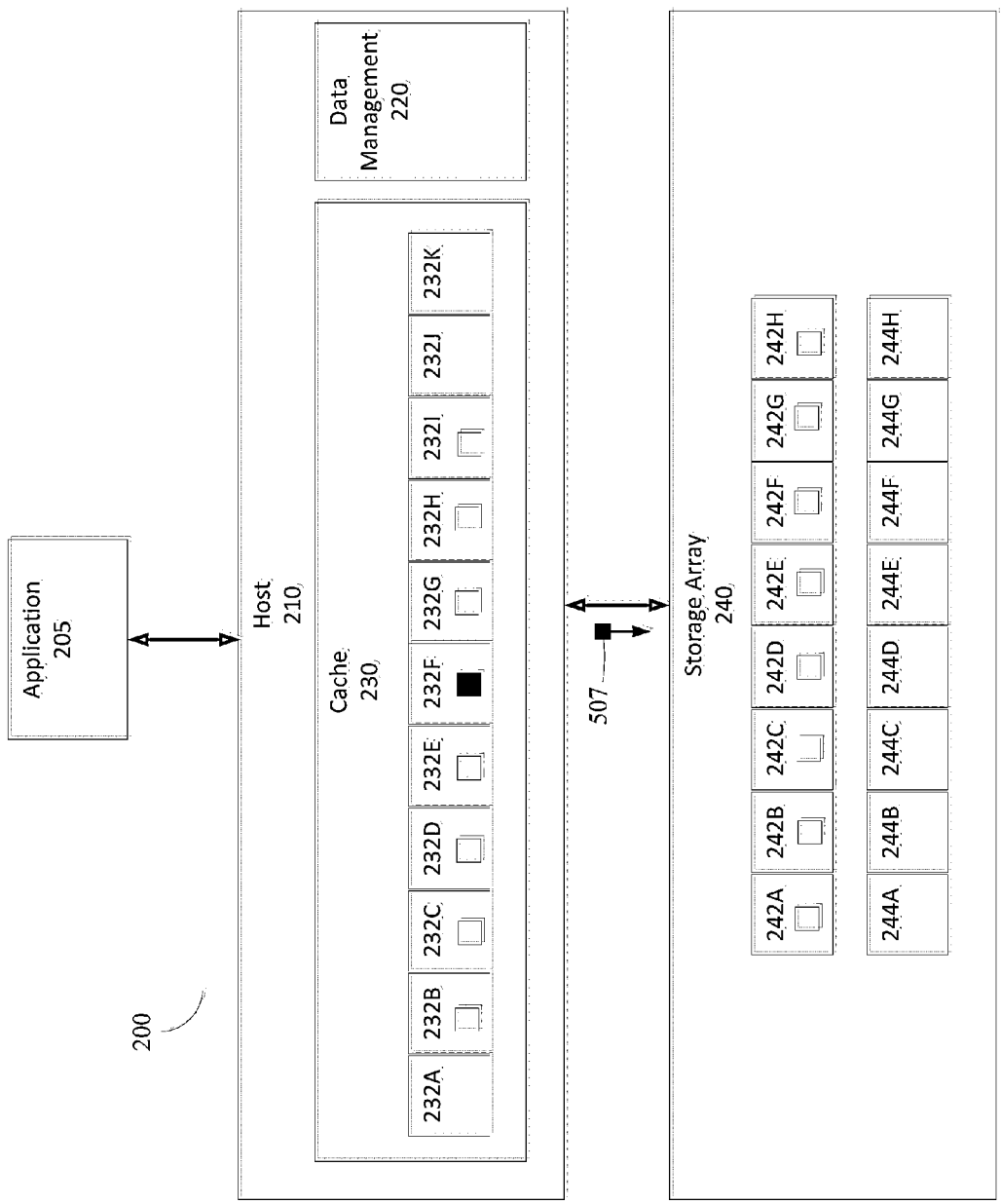
FIG. 5 is a simplified state diagram of a data storage system, in accordance with the present disclosure.

Refer to the example embodiment of FIG. 5. FIG. 5 is a simplified state diagram of a data storage system, in accordance with the present disclosure. In this embodiment, host-cache 230 writes memory portions 232B-I, which includes modified memory portion 232F, to data storage array 240 using message 507.

Figure 6:
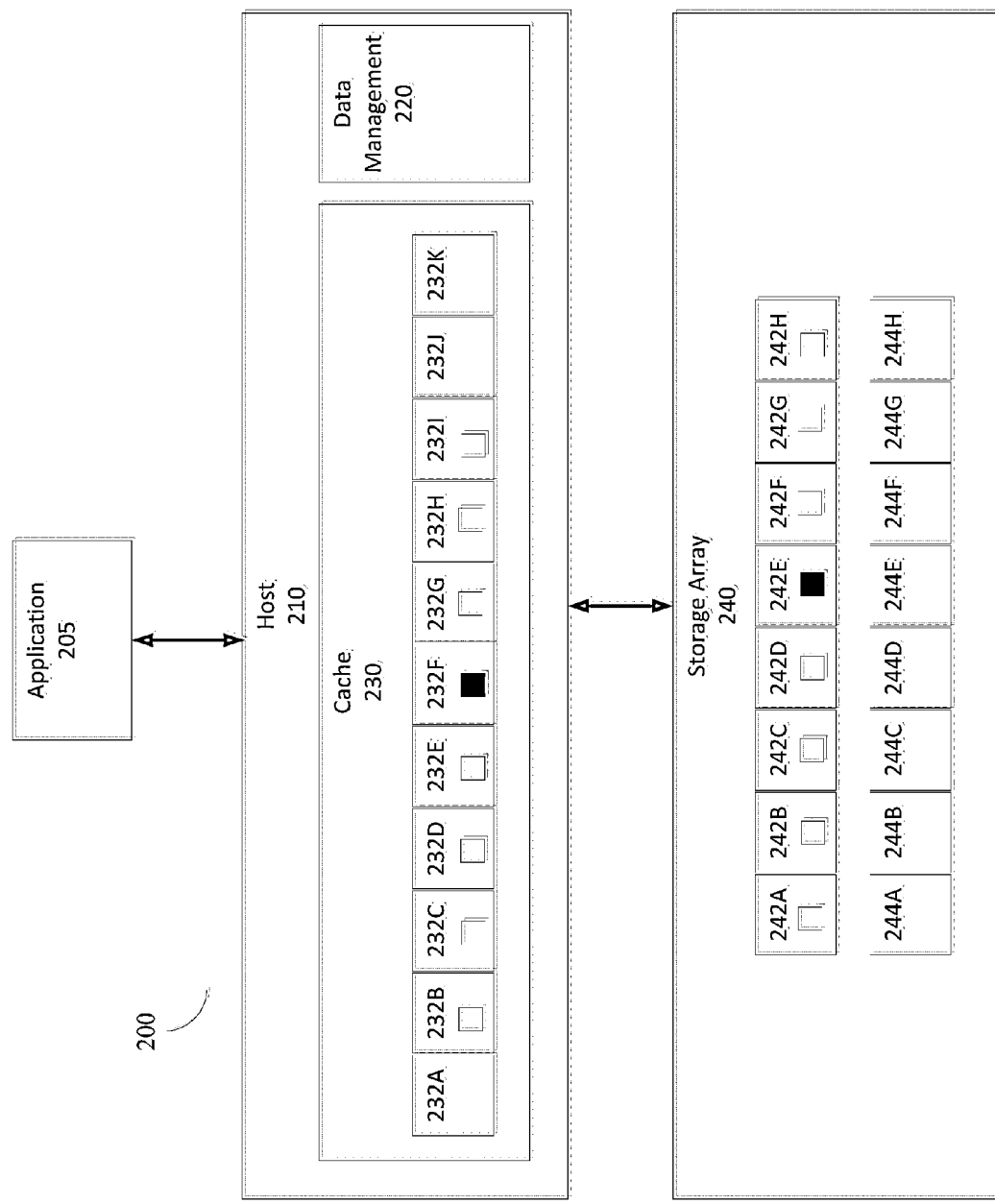
FIG. 6 is a simplified state diagram of a data storage system, in accordance with the present disclosure.

Refer to the example embodiment of FIG. 6. FIG. 6 is a simplified state diagram of a data storage system, in accordance with the present disclosure. As shown, data storage array 240 received message 507 (FIG. 5) and executed an aligned write to storage portion 242 on data storage array 240.

Figure 7:
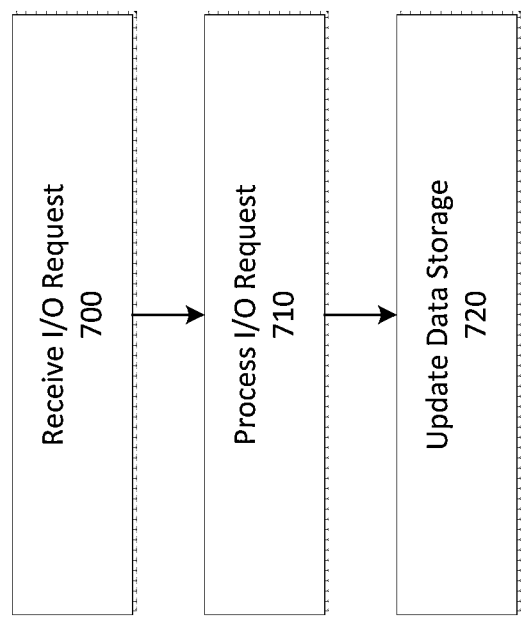
FIG. 7 is a simplified flowchart of a method of writing and/or modifying data in a data storage system, in accordance with an embodiment of the present disclosure.

Refer to the example embodiments of FIGS. 6 and 7. FIG. 7 is a simplified flowchart of a method of writing and/or modifying data in a data storage system, in accordance with an embodiment of the present disclosure. Data storage system 200 receives I/O request (Step 700) from application 205 in message 207 (FIG. 2). Data management module 220 in host 210 processes the I/O request (Step 710) to determine whether the I/O request relates to data stored within host-cache 230. As shown in FIG. 3, data management module 220 determines that data blocks related to the received I/O request are in memory portions in host-cache 230. Data management module 220 modifies host-cache 230. Data management module 220 directs host-cache 230 to update data storage array 240 (Step 720).

Figure 8:
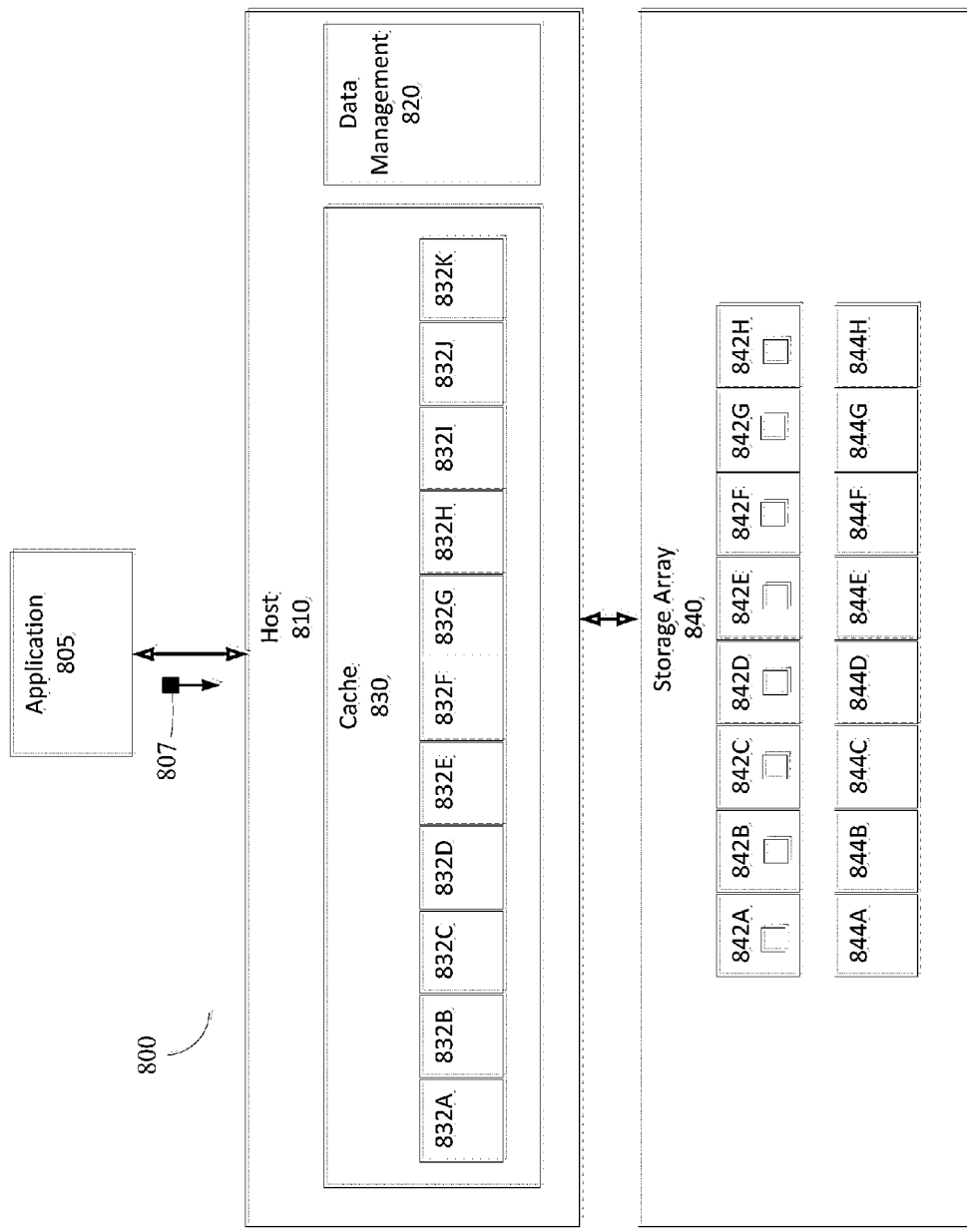
FIG. 8 is a simplified state diagram of a data storage system managing an I/O request, in accordance with an embodiment of the present disclosure.

Refer to the example embodiment of FIG. 8. FIG. 8 is a simplified state diagram of a data storage system managing an I/O request, in accordance with an embodiment of the present disclosure. As shown, data storage system 800 includes host 810 and data storage array 840. Host 810 includes data management module 820 and host-cache 830. Host-cache 830 includes memory portions (832A-K, 832 generally). Data storage array 840 includes storage portions (842A-H, 842 generally) (844A-H, 844 generally). As show, storage portions 842 contain data blocks. In this embodiment, application 805 is executed on host 810 and is in communication with data storage system 800. Application 805 is enabled to send message 807 to data storage system 800. Message 807 is enabled to contain an I/O request for storage portions 842 in data storage array 840.

Figure 9:
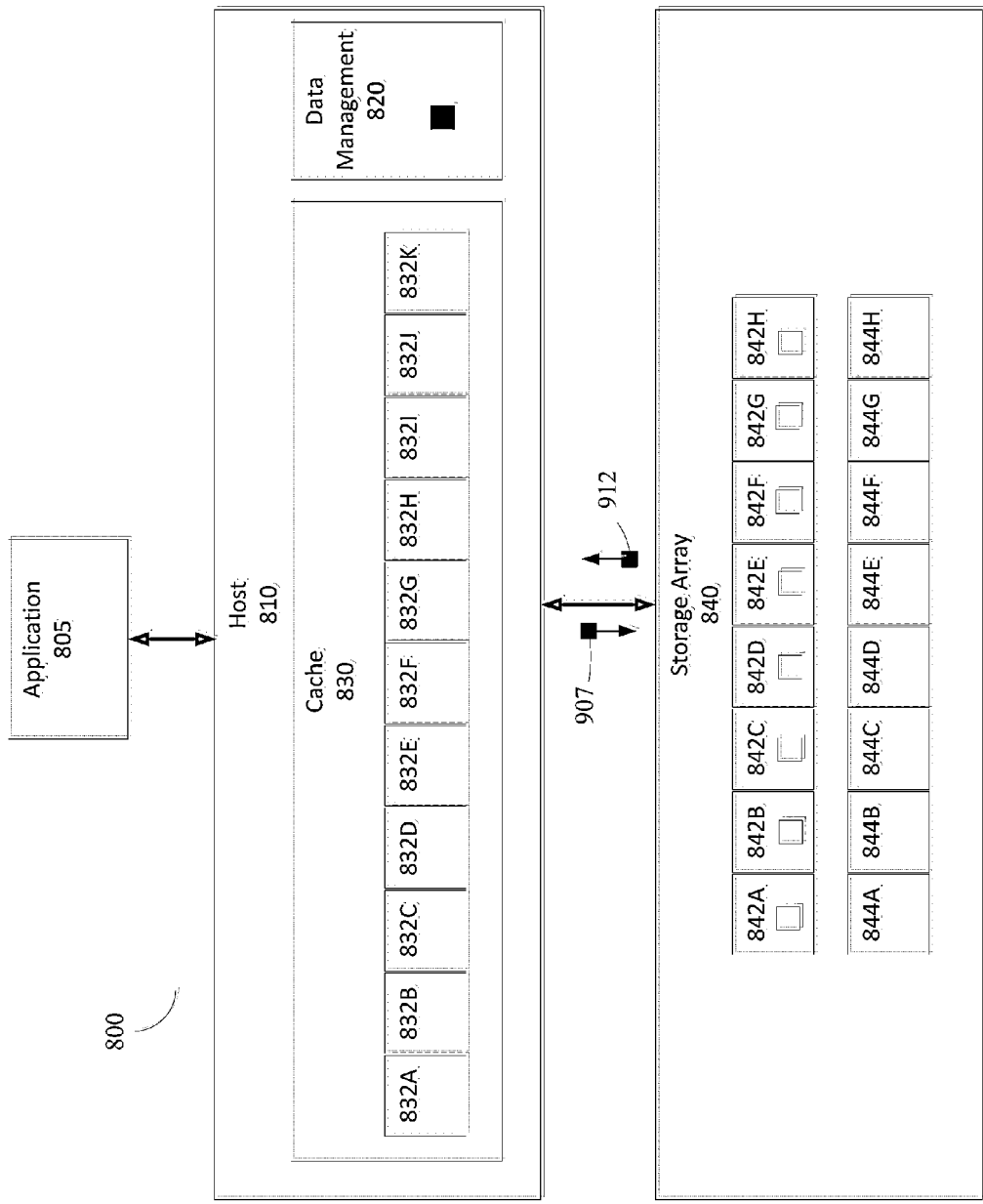
FIG. 9 is a simplified state diagram of a data storage system managing an I/O request, in accordance with an embodiment of the present disclosure.

Refer to the example embodiment of FIG. 9. FIG. 9 is a simplified state diagram of a data storage system managing an I/O request, in accordance with an embodiment of the present disclosure. As shown, data management module 820 has received an I/O request and associated data block. Data management module 820 has determined that host-cache 830 does not contain any data blocks related to the received I/O request. Data management module 820 directs host-cache 830 to read data blocks from storage portion 842 in message 907. Data storage array 840 is enabled to send a read from storage portion 842 in a single read in message 912.

Figure 10:
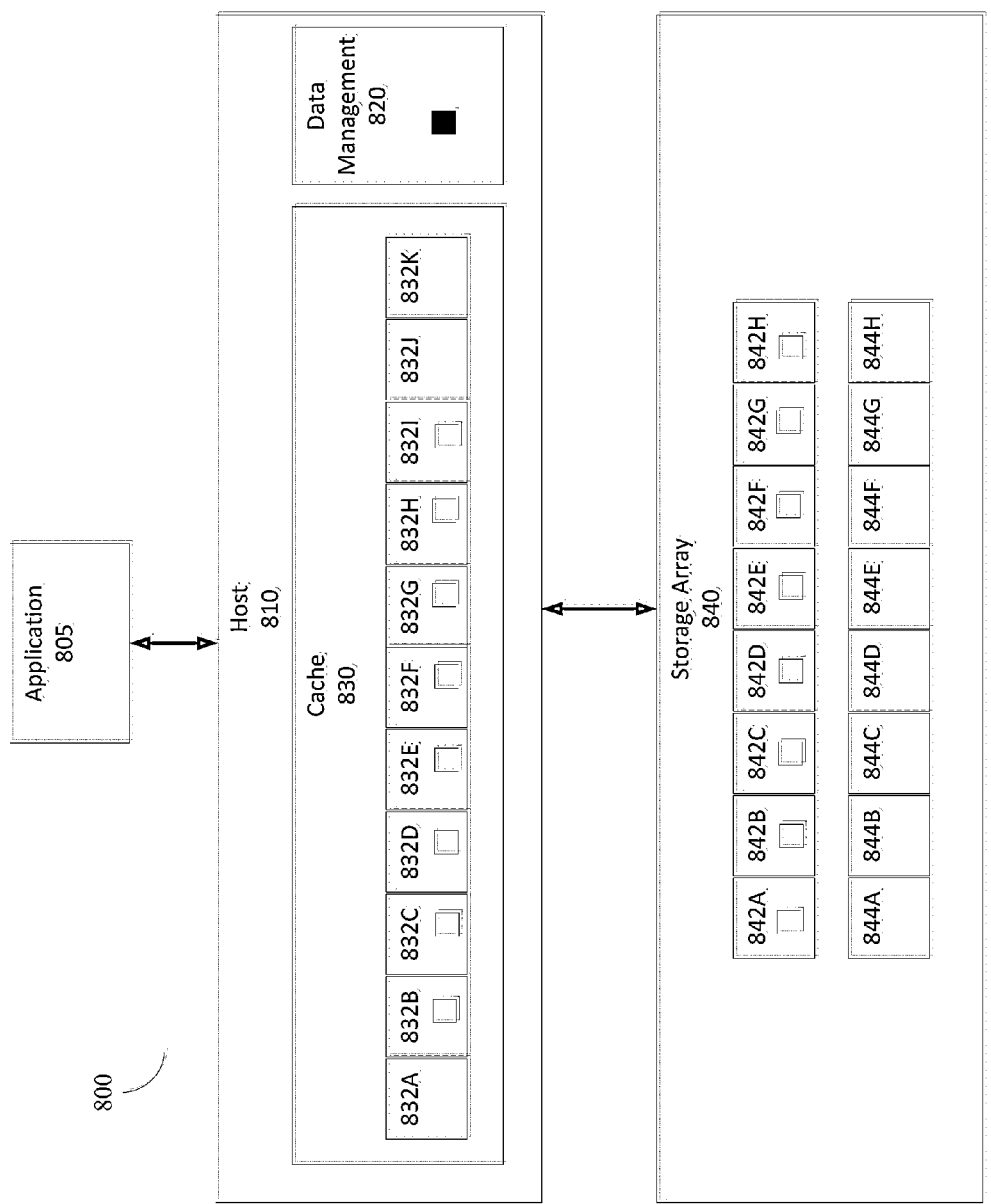
FIG. 10 is a simplified state diagram of a data storage system managing an I/O request, in accordance with an embodiment of the present disclosure.

Refer to the example embodiment of FIG. 10. FIG. 10 is a simplified state diagram of a data storage system managing an I/O request, in accordance with an embodiment of the present disclosure. Host-cache 830 stores received data blocks from data storage array 840 in memory portions 832B-I.

Figure 11:
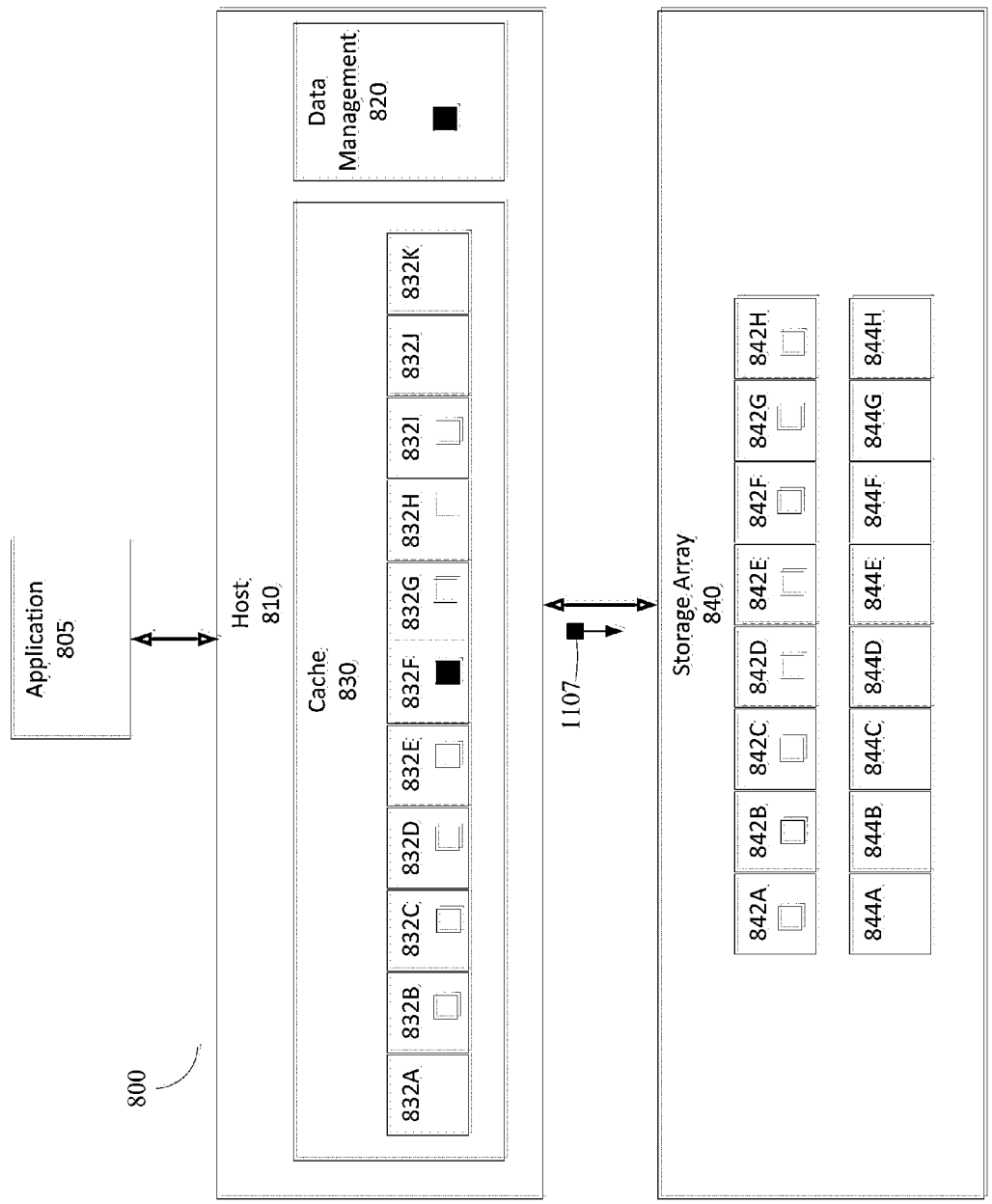
FIG. 11 is a simplified state diagram of a data storage system managing an I/O request, in accordance with an embodiment of the present disclosure.

Refer to the example embodiment of FIG. 11. FIG. 11 is a simplified state diagram of a data storage system managing an I/O request, in accordance with an embodiment of the present disclosure. In this embodiment, Data management module 820 modifies memory portion 832F in host-cache 830. Data management module 820 directs host-cache 830 to make an aligned write to data storage array 840 using message 1107.

Figure 12:
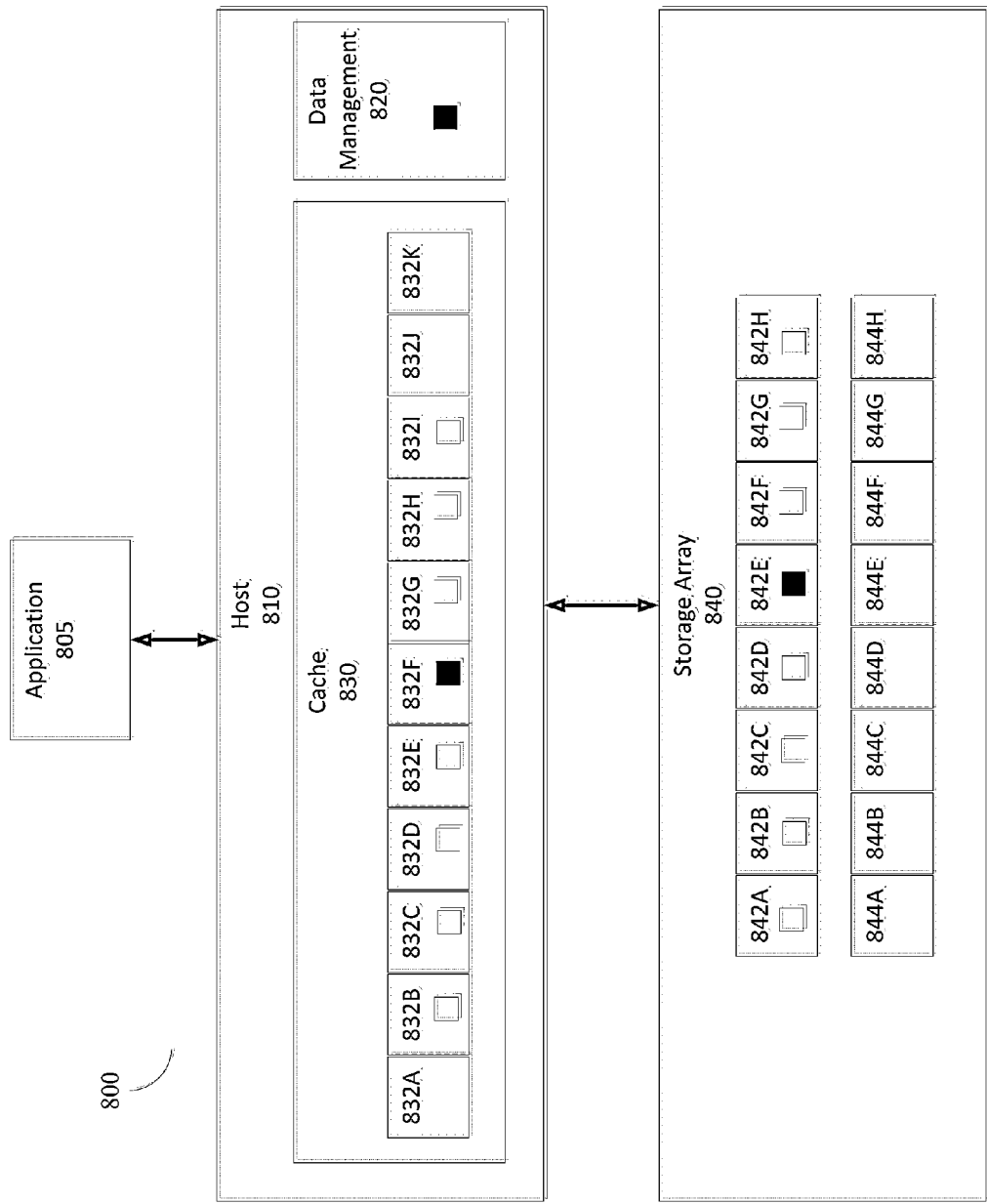
FIG. 12 is a simplified state diagram of a data storage system managing an I/O request, in accordance with an embodiment of the present disclosure.

Refer to the example embodiment of FIG. 12. FIG. 12 is a simplified state diagram of a data storage system managing an I/O request, in accordance with an embodiment of the present disclosure. As shown, host-cache 830 has updated storage portions 842 from memory portions 832B-I.

Figure 13:
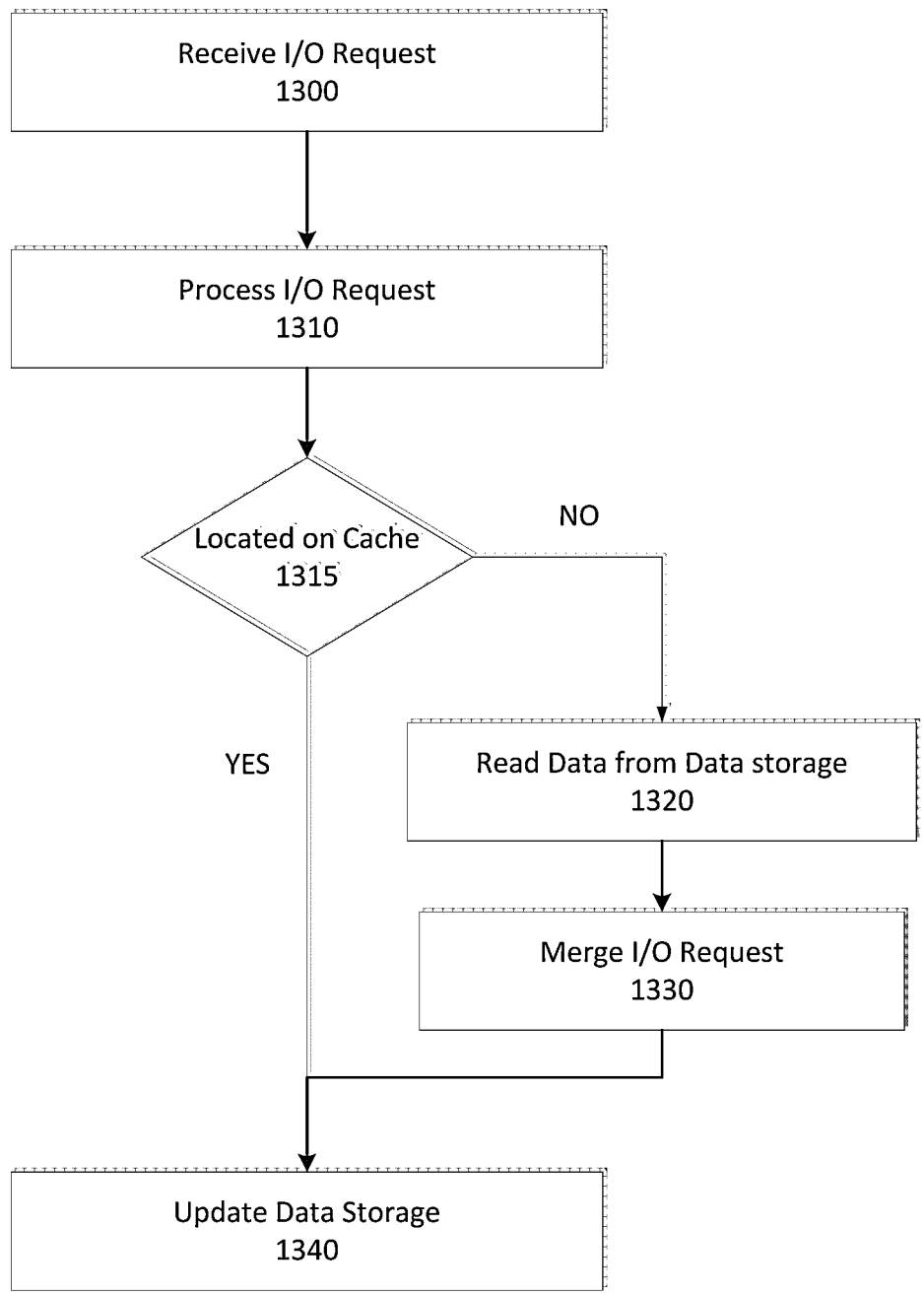
FIG. 13 is a simplified flowchart of a method of managing an I/O request in a data storage system, in accordance with an embodiment of the present disclosure.

Refer to the example embodiments of FIGS. 12 and 13. FIG. 13 is a simplified flowchart of a method of managing an I/O request in a data storage system, in accordance with an embodiment of the present disclosure. Data storage system 800 (FIG. 8) receives an I/O request from application 805 (Step 1300). Data management 820 (FIG. 9) processes I/O request (Step 1310). Data management 820 (FIG. 9) attempts to locate whether data blocks related to the I/O request are located on host-cache 830 (FIG. 9) (Step 1315). In this embodiment, data management module 820 (FIG. 9) determines that the I/O request is related to data blocks that are not stored on cache 830 (FIG. 9) and directs Cache 830 to read data blocks from data storage array 840 (Step 1320) using message 907.

Data management module 820 merges data within the received I/O request with memory portion 832F in host-cache 830 (Step 1330). Data management module 820 directs host-cache 830 to make an aligned write to data storage array 840 and update storage portions 842 in data storage array 840 (Step 1340).

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 14:
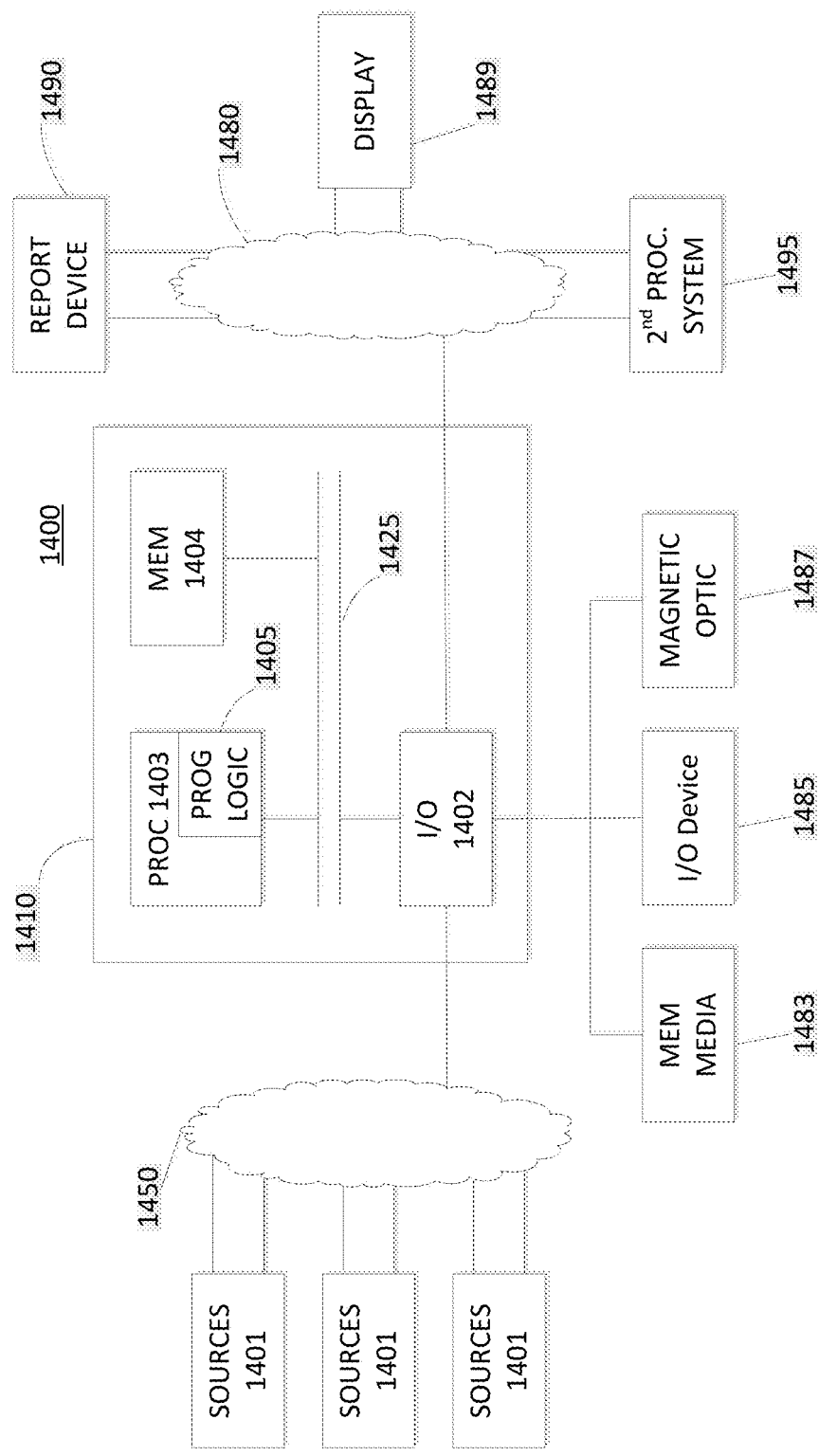
FIG. 14 is an example of an embodiment of an apparatus that may utilize the techniques described herein, in accordance with an embodiment of the present disclosure.

FIG. 14 is a block diagram illustrating an apparatus, such as a computer 1410 in a network 1400, which may utilize the techniques described herein according to an example embodiment of the present invention. The computer 1410 may include one or more I/O ports 1402, a processor 1403, and memory 1404, all of which may be connected by an interconnect 1425, such as a bus. Processor 1403 may include program logic 1405. The I/O port 1402 may provide connectivity to memory media 1483, I/O devices 1485, and drives 1487, such as magnetic or optical drives. When the program code is loaded into memory 704 and executed by the computer 1410, the machine becomes an apparatus for practicing the invention. When implemented on one or more general-purpose processors 1403, the program code combines with such a processor to provide a unique apparatus that operates analogously to specific logic circuits. As such, a general purpose digital machine can be transformed into a special purpose digital machine.

Figure 15:
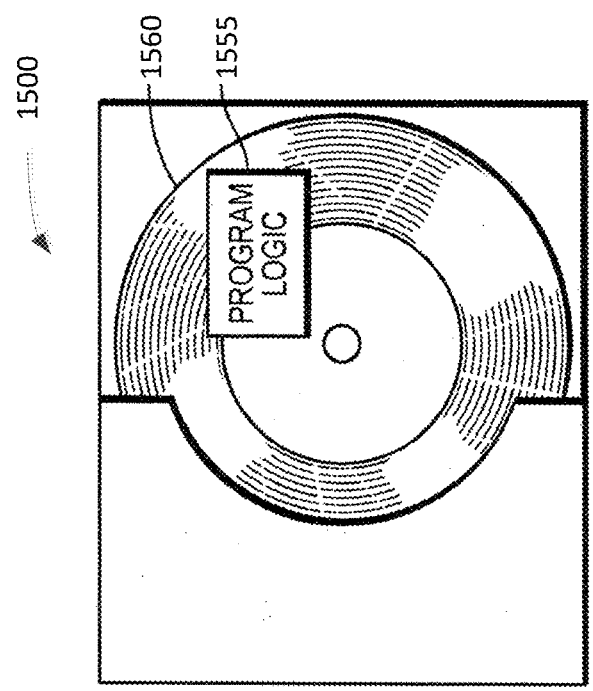
FIG. 15 is an example of a method embodied on a computer readable storage medium that may utilize the techniques described herein, in accordance with an embodiment of the present disclosure.

FIG. 15 is a block diagram illustrating a method embodied on a computer readable storage medium 1560 that may utilize the techniques described herein according to an example embodiment of the present invention. FIG. 15 shows Program Logic 1555 embodied on a computer-readable medium 1560 as shown, and wherein the Logic is encoded in computer-executable code configured for carrying out the methods of this invention and thereby forming a Computer Program Product 1500. Program Logic 1555 may be the same logic 1405 on memory 1404 loaded on processor 1403 in FIG. 14. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-15. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing a data storage system, wherein the data storage system includes a host-cache and a data storage array, the computer-executable method comprising:
   receiving an I/O request;
   processing the I/O request by locating data related to the I/O request and aligning the I/O request with the data to create an aligned portion of data; and
   updating the data storage array with the aligned portion of data.

2. The computer-executable method of claim 1, wherein aligning the I/O request comprises:
   determining whether the data related to the I/O request is located in the host-cache; and
   upon a positive determination, executing the I/O request on the data located in the host-cache.

3. The computer-executable method of claim 2, further comprising:
   upon a negative determination, executing the I/O request to the cache; and
   reading the data from the data storage array to the host-cache, wherein the cache merges the data with the I/O request creating the aligned portion of data.

4. The computer-executable method of claim 1, wherein the data is an aligned portion of the data storage array.

5. The computer-executable method of claim 1, wherein the cache is host based flash cache.

6. The computer-executable method of claim 1, wherein the I/O request is a write request to a portion of data on the data storage array.

7. A system, comprising:
   a data storage system, wherein the data storage system includes a host-cache and a data storage array; and
   computer-executable logic encoded in memory of one or more computers in communication with the data storage system to enable writes to the data storage array, wherein the computer-executable program logic is configured for the execution of:
   receiving an I/O request;
   processing the I/O request by locating data related to the I/O request and aligning the I/O request with the data to create an aligned portion of data; and
   updating the data storage array with the aligned portion of data.

8. The system of claim 7, wherein aligning the I/O request comprises:
   determining whether the data related to the I/O request is located in the host-cache; and
   upon a positive determination, executing the I/O request on the data located in the host-cache.

9. The system of claim 8, wherein the computer-executable program logic is further configured for the execution of:
   upon a negative determination, executing the I/O request to the cache; and
   reading the data from the data storage array to the host-cache, wherein the cache merges the data with the I/O request creating the aligned portion of data.

10. The system of claim 7, wherein the data is an aligned portion of the data storage array.

11. The system of claim 7, wherein the cache is host based flash cache.

12. The system of claim 7, wherein the I/O request is a write request to a portion of data on the data storage array.

13. A computer program product for managing a data storage system, wherein the data storage system includes a host-cache and a data storage array, the computer program product comprising:
   a non-transitory computer readable medium encoded with computer-executable program code for using read signatures in replication, the code configured to enable the execution of:
      receiving an I/O request;
      processing the I/O request by locating data related to the I/O request and aligning the I/O request with the data to create an aligned portion of data; and
      updating the data storage array with the aligned portion of data.

14. The computer program product of claim 13, wherein aligning the I/O request comprises:
   determining whether the data related to the I/O request is located in the host-cache; and
   upon a positive determination, executing the I/O request on the data located in the host-cache.

15. The computer program product of claim 14, the code is further configured to enable the execution of:
   upon a negative determination, executing the I/O request to the cache; and
   reading the data from the data storage array to the host-cache, wherein the cache merges the data with the I/O request creating the aligned portion of data.

16. The computer program product of claim 13, wherein the data is an aligned portion of the data storage array.

17. The computer program product of claim 13, wherein the cache is host based flash cache.

18. The computer program product of claim 13, wherein the I/O request is a write request to a portion of data on the data storage array.

\* \* \* \* \*